United States Patent [19]

Brummett

[11] 4,312,697
[45] Jan. 26, 1982

[54] BRUSH ASSEMBLY HOLDING SLEEVES POSITIONED ON A CONTAINER

[75] Inventor: Marshall G. Brummett, Toledo, Ohio
[73] Assignee: Owens-Illinois, Inc., Ohio
[21] Appl. No.: 898,358
[22] Filed: Apr. 21, 1978
[51] Int. Cl.³ .............................................. B65C 3/08
[52] U.S. Cl. ................................... 156/423; 156/487; 156/499; 156/556; 198/836
[58] Field of Search ............... 198/836; 156/423, 447, 156/487, 489, 499, 498, 556, DIG. 42, 196

[56] References Cited

U.S. PATENT DOCUMENTS

| | | | |
|---|---|---|---|
| 2,631,748 | 3/1953 | Schirmer | 156/487 |
| 3,201,299 | 8/1965 | Fairest | 156/487 |
| 3,722,663 | 3/1973 | Nalbach | 198/836 |
| 3,776,350 | 12/1973 | Tice | 198/836 |
| 3,800,938 | 4/1974 | Stone | 198/836 |
| 3,802,942 | 4/1974 | Amberg et al. | 156/196 |
| 3,959,065 | 5/1976 | Ashcroft | 156/423 |
| 4,012,271 | 3/1977 | Brummett et al. | 156/423 |

FOREIGN PATENT DOCUMENTS 1940933 11/1971 Fed. Rep. of Germany ...... 156/487

*Primary Examiner*—Jerome W. Massie
*Attorney, Agent, or Firm*—D. T. Innis; M. E. Click; D. H. Wilson

[57] ABSTRACT

There is disclosed a brush assembly that is shaped to an elongated longitudinal contour corresponding with the path for articles carried by a conveyor between an assembly station, whereat sleeves of heat shrinkable thermoplastic are telescopically placed thereon, and a tunnel-like oven. The sleeves are positioned in the assembly station in a position for subsequent heat shrinkage. The sleeves are each engaged by flexible bristle or like projections of the brush assembly during movement between assembly and the oven which hold the sleeve in place on the article. The disclosed brush assembly is an improvement when added to the machine of the type disclosed in U.S. Pat. No. 4,012,271, and in one preferred form of the invention the brush assembly is used in conjunction with the water-cooled support bar of that disclosure. An adjustable support means is also disclosed for locating the brush assembly in relation to an elevation of the article and toward or away from said article.

4 Claims, 5 Drawing Figures

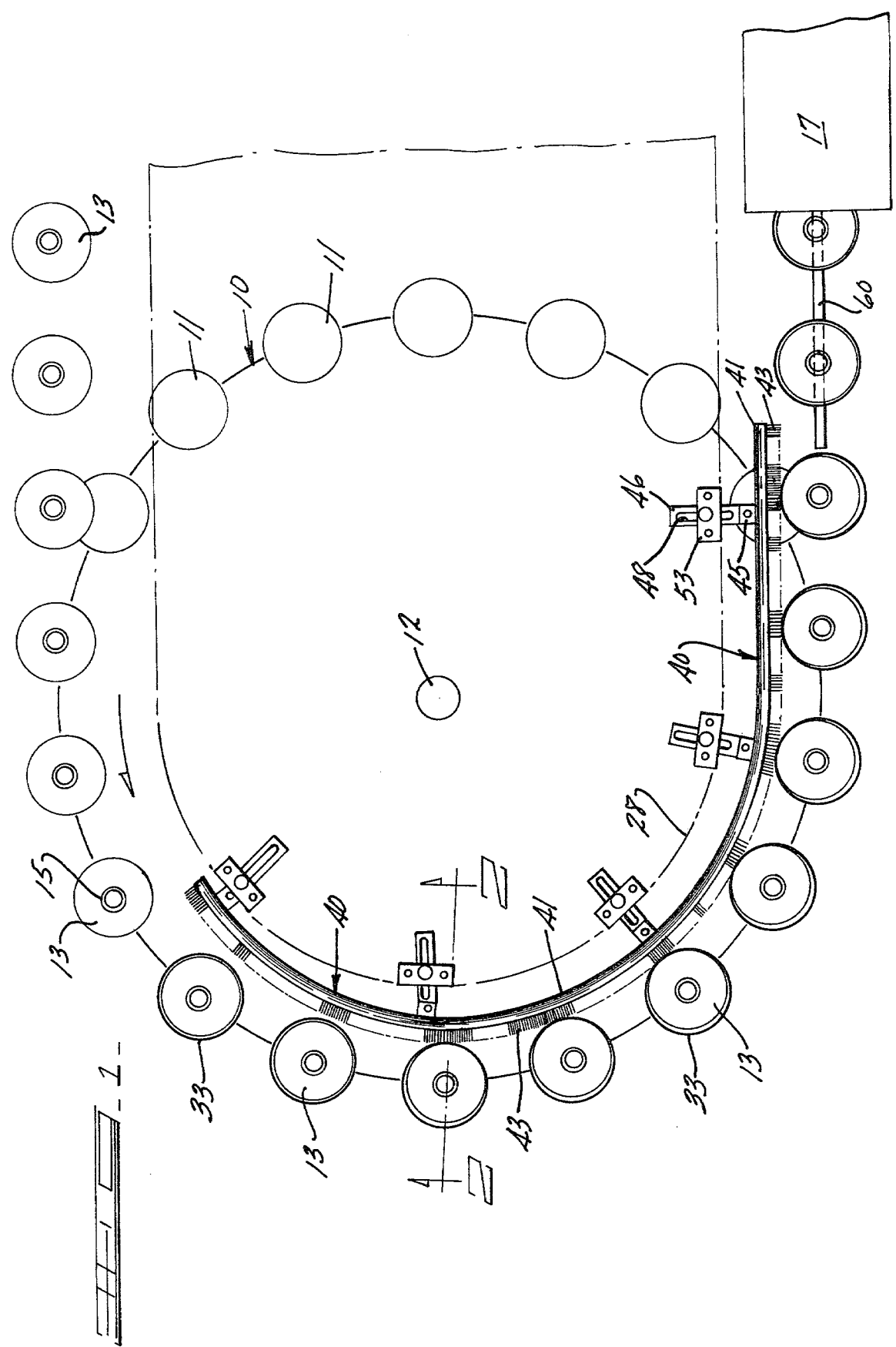

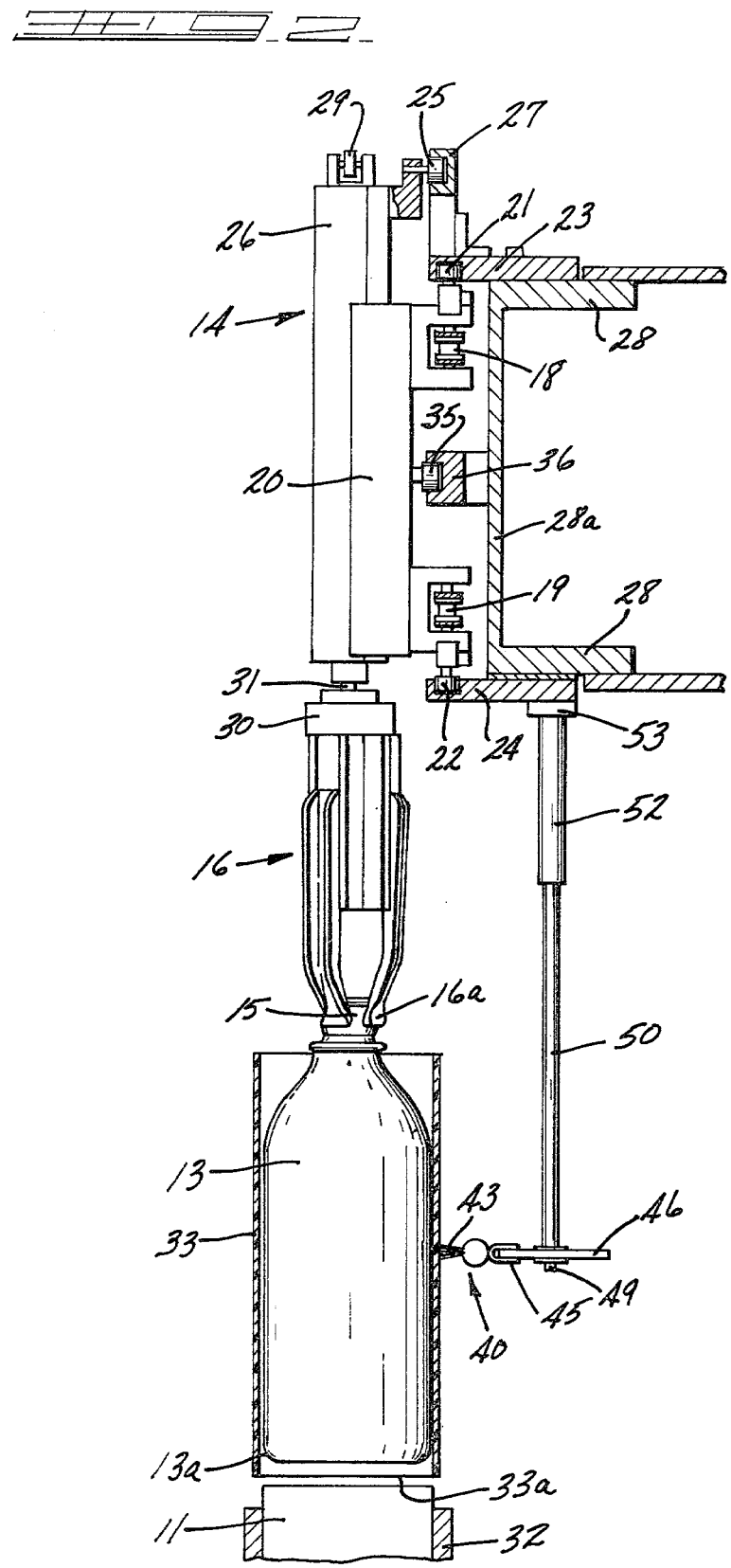

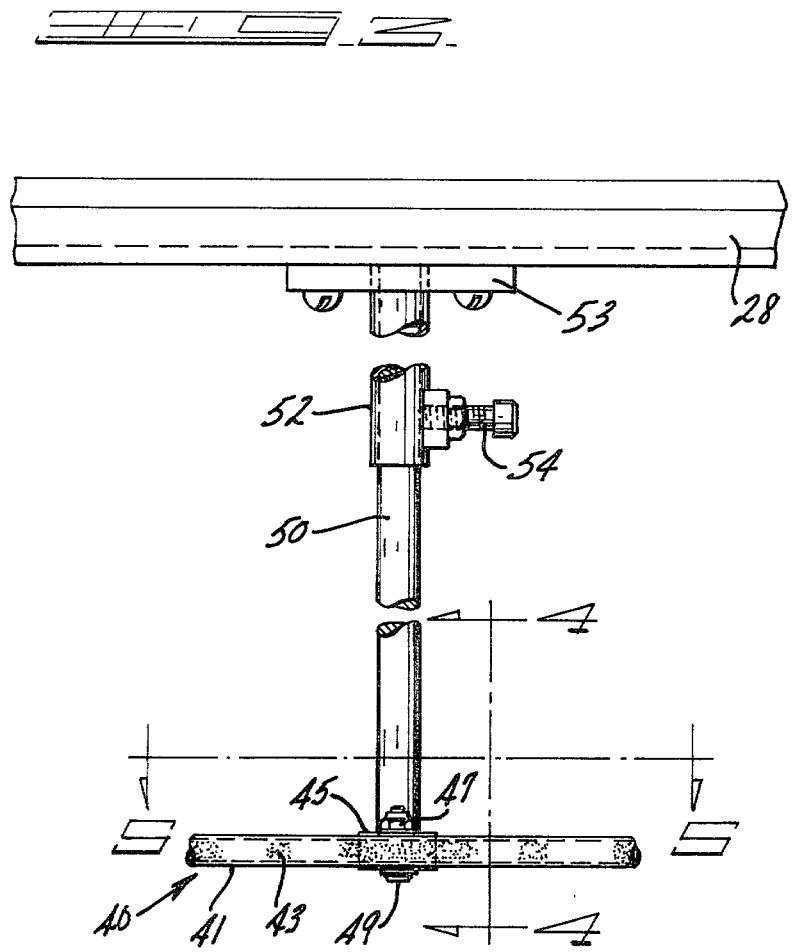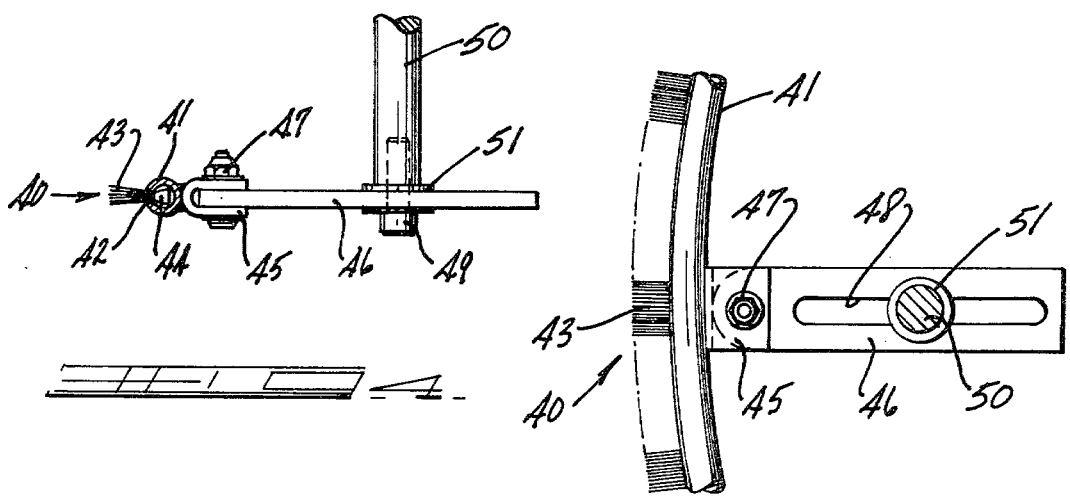

BRUSH ASSEMBLY HOLDING SLEEVES POSITIONED ON A CONTAINER

The present invention relates to manufacture of articles such as containers in which a sleeve of heat contractable material is applied over an outer surface area portion of the article and thereafter shrunken to a conforming relationship thereon. More particularly, the invention is concerned with the telescopic placement of the hollow tubular sleeve of the plastic on the article and holding it in that position during transfer of the article to a heating device, such as a tunnel oven, whereat the final shrink forming of the sleeve is performed.

BACKGROUND OF THE INVENTION

This invention provides an improvement in the apparatus of U.S. Pat. Nos. 4,012,271 in manufacture of glass containers that are so covered or wrapped with a heat shrinkable thermoplastic, one example thereof being disclosed in U.S. Pat. No. 3,760,968, wherein the containers are conveyed in vertical upright position by a ware handling conveyor in single file past an assembly station of a sleeve making apparatus. The sleeves are formed on this apparatus or in the alternative they are fed axially from the apparatus to overlie and encircle a portion of the container during the initial assembly stage of the tube. The sleeve assembly apparatus may take the form of a rotary turret machine with the spaced mandrels holding the plastic sleeves. The turret and the container conveyor are operated in a registered and synchronized manner and when the sleeves and containers are united telescopically initially so that the former encircles the latter, the containers are in a continuous movement through an assembly station. One such machine is disclosed in U.S. Pat. No. 3,959,065. From the assembly station, the containers and sleeves move to a heat applying apparatus to shrink the plastic sleeve snugly over the container surface whereat it is assembled. This is usually and conveniently accomplished by conveying the ware and sleeve through a tunnel-like oven chamber.

In conveying the ware and sleeve from the assembly station to the heating apparatus, as in the example just mentioned, there is a need to assure that the sleeve maintains itself in place on the container. Should the sleeve slip from its place or fall partly or totally from the container, the subsequent heating will shrink the sleeve where it happens to be at the time it arrives in the oven chamber. Therefore, to avoid off-ware and possible fouling of the equipment, it is important to assure the sleeve is kept in its assembled position up to and at the time of heat shrinking.

To do this, various means have been devised. One of these has been a use of underlying wire or rod running from the assembly machine or its assembly station to the oven. Another is the means devised in the aforementioned U.S. Pat. No. 3,959,065, wherein the sleeve and container at the point of telescopical assembly pass a narrow heater which in effect partially shrinks a band region of the plastic sleeve and attaches the sleeve to the bottle thereby holding it in place until final total heat shrinking is completed. Still another form of device used to assure this positioning of the sleeve is disclosed in the aforementioned U.S. Pat. No. 4,012,271 wherein an underlying bar extends from adjacent the assembly machine into the oven chamber and obviates the sleeve slipping axially on the container before shrinking.

SUMMARY OF THE INVENTION

By the present invention there is provided an elongated narrow brush assembly which corresponds with the path described for the transfer of the container and sleeve from its assembly station to the heating apparatus. The bristles of the brush assembly engage the sleeve along one side of the container and through the brushing force or action of the brush assembly on the sleeve hold it in place on the container. The brushing force is applied preferably in a lateral direction. In some forms of plastic, there is a tacky affinity between the plastic and a container such as a glass container which the brushing enhances the engagement and the tackiness to a large degree holds the sleeve in place. Also, by pushing the plastic into engagement with the wall of the container, air is removed in the interface region of engagement and the air pressure of the atmosphere assists in holding the sleeve in place thereat further enhanced by the brushing motion. The brush assembly is supported by the machinery frame or like structure by means of brackets including mounting fixtures that will include adjusting the brush bristle toward and away from the path of the container; thereby allowing for easy changeover for production of various size or shape articles.

Furthermore, the invention is used in one preferred example herein disclosed in conjunction with the water-cooled support bar of the type disclosed in U.S. Pat. No. 4,012,271 (in which the present inventor was a coinventor) such that the herein disclosed brush assembly engages the plastic sleeve placed on the article during movement up to or just prior to entry into the oven chamber, whereat the water-cooled support bar overlaps somewhat in this path with the brush assembly and the latter then guides the sleeve position-wise, at least, while in the oven chamber. The disclosure of U.S. Pat. No. 4,012,271 is therefore incorporated herein by reference for disclosure of the latter-mentioned device. This last-mentioned preferred embodiment of the invention is most suitable for a style of production of plastic wrap containers in which the sleeve is of some axial rigidity and is positioned upon assembly to overhang the bottom end of the container and as such shrink over a portion of its bottom end.

The invention does provide a means for maintaining assembled position of the plastic sleeve on the article over a variety of wrap style articles, such as in the case where sleeves are to be shrunk along an axial middle portion of the article or near the top end or over the top end of the article. Also, since the brush assembly holds the sleeve in place by its radial inward pressure against the side of the article, the tolerance of fit between the I.D. of the plastic sleeve and the outside dimension (O.D.) of the article need not be so closely controlled; all of which provides greater flexibility and ease of manufacture. In this regard, production is made more efficient and simplier.

A further feature of the invention is in the simplicity of structure, low maintenance and ease of adjustment in change of size of article processed. The mounting for the brush assembly provides simple adjustments for changing height or elevation of the brush contact in relation to the article exterior surface and a lateral adjustment toward or away from the center line of the article conveyor path for change of size of article or brushing pressure, as may be needed in use in production.

Other advantages or features of the invention will be more readily apparent to those skilled in the art from the following detailed description of the drawings on which:

DESCRIPTION OF THE DRAWINGS

FIG. 1 is a top plan view of the invention used on a production machine (represented generally in basic outline) for plastic shrink wrap application on bottles;

FIG. 2 is a sectional elevational view taken along line 2—2 on FIG. 1;

FIG. 3 is a fragmentary elevational view of the brush assembly of the invention showing its mounting on support standards for establishing a preferred operating position;

FIG. 4 is an elevational view taken along line 4—4 on FIG. 3; and

FIG. 5 is a plan view taken along line 5—5 on FIG. 3.

DESCRIPTION

There is shown on FIG. 1 a machine for producing plastic sleeves on a turret machine 10 which includes a series of equally spaced cylindrical mandrels 11. The turret machine 10 is shown in outline form, the turret being driven rotationally about the center shaft 12 in a counterclockwise direction on FIG. 1. For convenience of illustration, the drawing of FIG. 1 includes but an outline in plan of the machine and details thereof can be readily determined from the cross-referenced U.S. Pat. No. 4,012,271 cited earlier herein. The rigid base articles, such as the containers 13, are carried by the conveyor 14 (FIG. 2) which includes spaced apart chucks 16 that grasp the container by its upper neck finish 15. The path of the conveyor 14 in reference to FIG. 1 includes the span of travel from near the top of FIG. 1 and overlaps the arcuate path of the mandrels 11 on the turret 10 in vertical axial registry therewith throughout substantially the semicircular portion of the turret and diverging therefrom in a straight line into an elongated oven chamber 17 (near the bottom of FIG. 1) which serves as a heat applying apparatus for shrinking the sleeves on containers which are carried by the conveyor through it.

Referring again to FIG. 2, the conveyor 14 is comprised of an endless chain driven carriage having upper chain 18 and lower chain 19 respectively extending around end-turn gears prescribing the aforementioned path over turret 10. The chucks are mounted on carriage brackets 20 connected to the links of the chains 18 and 19. The several carriage brackets to make up the conveyor have spaced rollers 21, 22, and 35 on their back sides running in three stationary tracks supported along the path for the conveyor and on the frame of the machine. Upper rollers 21 run in a track 23 attached onto the main frame 28 of the machine. Likewise a lower roller 22 runs in a track 24 similarly attached to the frame 28. The central roller 35 runs in track 36 attached to the vertical web 28a of beam 28 of the frame. The chucks 16 are each vertically slideably mounted by their respective carriage brackets 20 for vertical movement, as follows. Each chuck includes an upper element 26 including vertical slides 27 that mate with slide ways in bracket 20. The vertical position of upper element 26 and the chuck is under control of roller 25 running in a cam 27. The profile of cam 27 along the conveyor path provides for proper lowering each chuck to pick up a container and raise it to operating elevation; and, again to lower the container and release it at the proper time in the process. The containers are grasped by three lower jaws 16a which open and close about the finish 15 at the open end of a container, such as a glass bottle illustrated herein. Jaws 16a are supported on a circular arbor 30 and is rotatable about shaft 31 of the chuck such that the article grasped may be rotated about its axis as it is held by the chuck. This rotation is provided by friction engagement of the periphery of the arbor or like element during movement along the conveyor path, or portions thereof. The jaws 16a are opened and closed by actuation of a center plunger rod attached to the cam roller 29 protruding from the top end of the upper chuck element 26. Included with the chuck are springs which normally close jaws 16a. To control opening and then closing the jaws, cam roller 29 engages a stationery cam (not shown) along the conveyor path, which operates the plunger rod to bias the closing springs.

As may be seen in FIG. 1, the conveyor path comes into registry with the underlying turret in a portion of their circular path mandrels 11 beginning at about the 12 o'clock position. The plastic sleeves 33 (FIG. 2) are carried by successive mandrels 11 to this position, and during movement with the containers 13 toward the 9 o'clock position on FIG. 1 they are stripped from the mandrel 11 vertically and assembled telescopically over the container. Stripping is done by the arcuate stripper 32 on each mandrel that is cam actuated (not shown) vertically during movement. This transfer of the sleeve over the bottle occurs in the sleeve assembly station, as is described herein.

The sleeves 33 are comprised of a heat shrinkable plastic material, such as a polyolefin or copolymers of olefin that is oriented in the circumferential dimension of the sleeve. Usually, this material possesses biaxial orientation, however, the circumference of the sleeve usually possesses a major amount of orientation. A variety of plastic materials of this type are desirable for use in heat shrink application onto containers for functional as well as decorative purposes. Some examples of materials utilized are in a range of a film that is on the order of 0.002–0.005 inch thickness to a foam in the range of 0.006–0.020 inch thickness. Also, and more important for this invention, materials of a foam/film lamination are used. The compound may be a medium to high density polyethylene in which a foam portion of 0.004–0.010 inch thickness is placed on the inside of the sleeve laminate and is provided with an outer laminate of polyethylene film on the order of 0.002–0.004 inch thickness. The sleeve of the example just mentioned has some lubricity over a clean glass bottle surface. The sleeves for assembly are of a slightly greater I.D. dimension than the O.D. of the container whereat the sleeve is to be placed. Accordingly, the sleeve 33 fits relatively loosely over the container 13 in the assembled position (See FIG. 2). In movement between the assembly station (at about 9 o'clock on FIG. 1) to placement and initial shrinkage in the oven 17, some assurance is needed that the sleeves will retain their assembled position on the container.

The present invention includes a brush assembly 40 that is shaped in longitudinal extent to correspond with the portion of the conveyor path from the assembly station to the entry of the oven. Brush assembly 40 is comprised of a hollow tube or pipe 41 which is of a ductile material and at least somewhat rigid, for example a steel or aluminum pipe shaped to the contour of the stated path portion. FIGS. 3-5 illustrate the brush assembly in more detail in the construction thereof. The pipe or tube 41 has a longitudinal, forward facing slot 42 provided throughout its length. A narrow brush that is elongated and comprised of the projecting bristles 43 and a backing or base 44 is inserted lengthwise in the shaped tube 41. The bristles may be synthetic composition or natural bristle, depending upon the friction and force requirement the bristles should have in riding over the exterior of a particular composition of sleeve. The base 44 is flexible and may be of one length or of segments such that it fits within the tube I.D. and is stable. Also, the base 44 should be readily capable of assembly in the tube by sliding along its length to position to provide the length of brush assembly needed. The bristles 43 project from base 44 through the front-facing slot 42 of the pipe 41.

The means for supporting the brush assembly its tube 40 in operating position for production is the following. Pipe 41 is mounted by the rear side U-shaped fixtures 45 fastened at spaced points thereon. The U-fixtures each receive a lateral bar 46 having an arcuate end and end fastener (FIG. 5), such as the nut-bolt fastener 47, and the bar 46 is longitudinally slotted at 48 wherein it receives a pin bolt 49. The bolt 49 is thread connected endwise onto a vertical shaft 50. The slot 48 of the bar carries a grooved annular element 51 and pin bolt 49 extends centrally of this and tightens it against the bottom end surface of shaft 50. Thus, each bar 46 may be adjusted rotationally and longitudinally with respect to shaft 50. The shaft 50 is received in a bushing sleeve 52 which is part of an upper bracket 53 bolted onto a rigid channel or other frame member of the frame structure 28 of the machine. This is best illustrated overall on FIG. 2. There are a plurality of the mounting brackets 53 and structure suspended therefrom, as just described, over the extent of the length of brush assembly 40 (FIG. 1). The vertical elevation of the shaft 50 and in turn the positioning of the brush assembly bristles in relation to the sleeves 33 is established by the set screw 54, a part of sleeve bushing 52, which is tightened against shaft 50.

By the brush assembly supporting means, such as just described, the brush bristles may be positioned to engage the exterior of the sleeves 33 as they are conveyed on the containers from the assembly station to the oven.

In the embodiment shown in the drawings, the brush assembly 40 is used in combination with a lower sleeve support bar 60 such that the two overlap each other, i.e. the terminal end 7 brush assembly 40 overlaps with underside sleeve support bar 60. The support bar 60 is of the type disclosed in the U.S. Pat. No. 4,012,271 referenced earlier herein and incorporated by reference for disclosure thereof. This support bar 60 is positioned in relation to the bottom edge 33a (FIG. 2) of sleeve 33 as the container/sleeve composite enter oven 17 so that the sleeve may not slip downwardly on the container 13. Any engagement edge 33a has with the top of bar 60 will inhibit such slippage long enough to shrink the sleeve snugly over the container in the heat atmosphere within oven 17.

On the other hand, it may be that the desired sleeve assembled position on the container is higher along the side-wall, rather than as shown, such that the lower edge 33a of the sleeve is in an assembled position that is above the lower radius or heel 13a of the container (not shown). If this is the case, the brush assembly 40 is extended at its terminal end to a distance within the oven 17 a sufficient extent to allow for oven heat to shrink sleeve 33 enough to grip the container wall and hold it in place at assembled position for completion of shrinkage. The extent of this projection within the oven will vary with the composition, type and thickness of the plastic sleeve. Polyethylene type sleeves having at least some foam in the material make up will, of course, require more oven length and higher temperature for this initial shrinkage state than will sleeves made of polyvinyl chloride film of relative thin caliper. In the latter example, the material initiates shrinkage quickly in a short span of oven and at relatively lower temperatures. In fact, under certain conditions the initial shrinkage may occur and be sufficient at the mouth of oven or adjacent thereto so as to enable release by—and termination of—the brush assembly.

Brush elements that need be adjacent or inside the oven 17 should be selected in choice of materials that will withstand the temperature conditions. This may require a differential in the brush 43 and base 44 used in the tube holder 41 at different locations along the conveyor path where situated. Therefore, lengths or segments of the bristle and base (43, 44) are used. The temperature conditions over the turret machine 10 are expected to be less severe in the portion that is between the 10 o'clock position (FIG. 1) and the 6 o'clock position to adjacent the entry mouth of oven 17. Therefore, the first-mentioned portion of span of the brush assembly may be constructed of less expensive brush and base (43, 44) materials than the ones installed in the latter-mentioned portion of the brush assembly which are needed to withstand higher temperature.

As shown on FIG. 1, the lead-in segment of the brush assembly 40 should be adjusted to gradually engage the sleeves 33 to the point of full engagement at the 9 o'clock position. The engagement by the bristles with the sleeve on the container should be positive at the time the sleeve is in fully assembled position and by the time the stripper 32 which placed the sleeve at that height begins its descent (separation) from the lower edge 33a (FIG. 2) of the sleeve. The condition shown on FIG. 2 represents the relation of the elements, i.e. bristles 43, sleeve 33, container 13, mandrel 11 and stripper 32, a short time after this transfer of the sleeve to the container to the assembled position of the former on the latter.

Having described a preferred embodiment and best contemplated mode for the invention, it is entirely possible that further modifications to the invention will occur to others in the art addressed once the invention is made known to them. Such modifications may be resorted to without departing from the spirit and scope of the appended claims.

I claim:

1. In an apparatus for telescopically assembling hollow sleeves of heat contractable thermoplastic relatively loosely on articles at an assembly station and transferring the articles with said sleeves in assembled position to a heating device for contracting the sleeves in place on the articles by heat, said apparatus including a conveyor means supporting a plurality of the articles in spaced relation for movement in a path including the assembly station to receive said sleeves in their said assembled position and through said heating device, the improvement therein comprising:

a longitudinally elongated brush assembly having flexible bristle-like elements projecting therefrom, said assembly being shaped longitudinally to a contour that corresponds substantially with the portion of said path for said articles extending from the assembly station to the proximity of the heating device, and means supporting said brush assembly along said portion of the path of the articles and locating the said bristle-like elements thereof with respect to the articles for engaging the plastic sleeves in assembled position thereon, said brushing engagement holding said sleeves in said assembled position during movement along said brush assembly.

2. The apparatus of claim 1 wherein said longitudinally elongated brush assembly comprises an elongated hollow tube having a longitudinally extending slit-like opening along its one side adjacent said article path, an elongated base element, and bristles attached to said base element depending therefrom along one side, said base element being adapted for insertion inside said tube for support thereby and said bristles projecting through said slit-like opening.

3. The apparatus of claim 2 wherein said base element comprises a plurality of lengths thereof and said lengths are positioned longitudinally along said tube and in end-to-end relationship.

4. The apparatus of claim 2 wherein said base element is comprised of a flexible, relatively yieldable synthetic material.

* * * * *